United States Patent
Parikh et al.

(10) Patent No.: US 10,917,811 B2
(45) Date of Patent: Feb. 9, 2021

(54) UPDATING MULTIPLE PACKET FILTERS IN A SINGLE BEARER CONTEXT IE

(71) Applicant: Parallel Wireless, Inc., Nashua, NH (US)

(72) Inventors: Ketan Parikh, Pune (IN); Nikhil Agarwal, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/182,601

(22) Filed: Nov. 6, 2018

(65) Prior Publication Data
US 2019/0141564 A1    May 9, 2019

Related U.S. Application Data

(60) Provisional application No. 62/582,231, filed on Nov. 6, 2017.

(51) Int. Cl.
*H04L 12/26* (2006.01)
*H04W 28/02* (2009.01)
*H04W 76/22* (2018.01)

(52) U.S. Cl.
CPC ....... *H04W 28/0263* (2013.01); *H04W 76/22* (2018.02)

(58) Field of Classification Search
CPC ............................ H04W 28/0263; H04W 76/22
USPC ....................................................... 370/235
See application file for complete search history.

(56) References Cited

U.S. PATENT DOCUMENTS

2003/0221016 A1* 11/2003 Jouppi ................ H04L 63/0236
709/245

OTHER PUBLICATIONS

3GPP TS 24.008 V9.3.0 (Jun. 2010); 3rd Generation Partnership Project; Technical Specification Group Core Network and Terminals; Mobile radio interface Layer 3 specification; Core network protocols; Stage 3 (Release 9), Jun. 2020.
3GPP TS 24.008 V13.11.0 (Sep. 2017); 3rd Generation Partnership Project; Technical Specification Group Core Network and Terminals; Mobile radio interface Layer 3 specification; Core network protocols; Stage 3 (Release 13), Sep. 2017.
3GPP TS 29.274 V13.11.0 (Sep. 2017); 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 13), Sep. 2017.
Wikipedia, "GPRS Tunnelling Protocol" Wikipedia, the Free Encyclopedia, downloaded Nov. 5, 2018.

* cited by examiner

*Primary Examiner* — Mang Hang Yeung
(74) *Attorney, Agent, or Firm* — Michael Y. Saji; David W. Rouille

(57) ABSTRACT

A method is disclosed, comprising: in a general packet radio services (GPRS) tunneling protocol (GTP) message to update a GTP tunnel with a traffic flow template (TFT), sending a first opcode in a header of a TFT message; sending a second opcode in a packet filter field of the TFT message; interpreting the first opcode to initiate at least two of creation, deletion, and updating of traffic flow templates (TFTs); and interpreting the second opcode to identify an existing packet filter for adding, replacing, and deleting a packet filter.

14 Claims, 6 Drawing Sheets

UPDATING MULTIPLE PACKET FILTERS IN A SINGLE BEARER CONTEXT IE

CROSS-REFERENCE TO RELATED APPLICATIONS

This application is a non-provisional conversion of U.S. Provisional Pat. App. No. 62/582,231, filed Nov. 6, 2017, and entitled "Efficient Method to Update Packet Filters on Devices on Wireless Network," which is hereby incorporated by reference in its entirety for all purposes. This application also hereby incorporates by reference for all purposes each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; US20170257133A1; US20140086120A1; US20140092765A1; US20140133456A1; US20140233412A1; US20150094114A1; US20150098385A1; US20150098387A1; US20150257051A1; US20160135132A1; and US20160044531A1. This application also hereby incorporates by reference for all purposes each of the following documents in their entirety: 3GPP TS 24.007; 3GPP TS 24.008; and 3GPP TS 29.274, each as of the date of the prior-filed provisional application in each release version, as appropriate.

BACKGROUND

GPRS Tunneling Protocol (GTP) is a group of IP-based communications protocols used to carry data within GSM, UMTS, LTE, 5G, and other networks. GPRS stands for general packet radio services. In 3GPP architectures, GTP and Proxy Mobile IPv6 based interfaces are specified on various interface points. GTP can be decomposed into separate protocols, GTP-C, GTP-U and GTP' (which is not discussed herein). GTP-C is used within the GPRS core network for signaling between core network nodes, e.g., a gateway GPRS support node (GGSN) and serving GPRS support node (SGSN) in the UMTS protocol, to, e.g., activate a session on a user's behalf (PDP context activation), to deactivate the same session, to adjust quality of service parameters, or to update a session for a subscriber who has just arrived from another SGSN. Similar signaling takes place for LTE networks (for bearers instead of PDP contexts) and 5G, etc. GTP-U is used for carrying user data within the GPRS core network and between the radio access network and the core network. The user data transported can be packets in any of IPv4, IPv6, or PPP formats. GTP-U tunnels are used to deliver data to UEs (user equipments, e.g., mobile devices); these GTP-U tunnels are called bearers in LTE or packet data protocol (PDP) contexts in 3G/UMTS.

Traffic flow templates (TFTs) are a mechanism for controlling GTP tunnels. The purpose of the traffic flow template information element is to specify the TFT parameters and operations for a tunnel. In addition, this information element may be used to transfer extra parameters to the network (e.g. the Authorization Token; see 3GPP TS 24.229). The TFT may contain packet filters for the downlink direction, the uplink direction or packet filters that apply for both directions. The packet filters determine the traffic mapping to each tunnel. The downlink packet filters shall be applied by the network and the uplink packet filters shall be applied by the mobile device. A packet filter that applies for both directions shall be applied by the network as a downlink packet filter and by the mobile device as an uplink filter. For example, a TFT would be specified to map a service data flow to a specific port. For example, the PDN gateway (PGW) in LTE is responsible for quality of service (QoS) enforcement and flow-based charging according to rules from the policy charging and rules function (PCRF), specifically by filtering of downlink user IP packets into the different QoS-based bearers. This is performed based on Traffic Flow Templates (TFTs). The TFTs use IP header information such as source and destination IP addresses and TCP port numbers to filter packets such as VoIP from web-browsing traffic, so that each can be sent down the respective bearers with appropriate QoS. For the purposes of the present application, any appropriate TFT may be used in conjunction with the present disclosure, including IPv4 and IPv6-based TFTs, and application protocol-based TFTs. TFTs are typically created when a tunnel is created, and may be updated during the life of the tunnel. GTP message for LTE are defined in 3GPP TS 29.274, and TFT encoding is defined in 3GPP TS 24.008, each of which is hereby incorporated by reference.

SUMMARY

In a first embodiment, a method is disclosed, comprising: in a general packet radio services (GPRS) tunneling protocol (GTP) message to update a GTP tunnel with a traffic flow template (TFT), sending a first opcode in a header of a TFT message; sending a second opcode in a packet filter field of the TFT message; interpreting the first opcode to initiate at least two of creation, deletion, and updating of traffic flow templates (TFTs); and interpreting the second opcode to identify an existing packet filter for adding, replacing, and deleting a packet filter.

The method may further comprise consolidating two GTP messages into a single GTP message including the first opcode and the second opcode. The first opcode may be an update existing TFT opcode. The first opcode may be an update existing TFT opcode and The first opcode has bit values (1, 0, 0) from bit 8 to bit 6 of a third octet of the TFT message. The second opcode may be a four-bit packet filter identifier. The second opcode may be associated with an operation corresponding to the first opcode and with a packet filter associated with the packet filter field of the second opcode. The GTP tunnel may be a downlink tunnel and The TFT may be applied to the downlink tunnel and The first and second opcodes may be interpreted within an operator network. The GTP tunnel may be an uplink tunnel and The first and second opcode may be interpreted at a user equipment (UE).

In a second embodiment, a non-transitory computer-readable medium is disclosed containing instructions which, when executed at a processor located at a network node, causes the network node to perform steps comprising: in a general packet radio services (GPRS) tunneling protocol (GTP) message to update a GTP tunnel with a traffic flow template (TFT), sending a first opcode in a header of a TFT message; sending a second opcode in a packet filter field of the TFT message; interpreting the first opcode to initiate at least two of creation, deletion, and updating of traffic flow templates (TFTs); and interpreting the second opcode to identify an existing packet filter for adding, replacing, and deleting a packet filter.

The instructions may further comprise instructions to consolidate two GTP messages into a single GTP message including the first opcode and the second opcode. The first opcode may be an update existing TFT opcode. The first opcode may be an update existing TFT opcode and The first opcode has bit values (1, 0, 0) from bit 8 to bit 6 of a third octet of the TFT message. The second opcode may be a four-bit packet filter identifier. The second opcode may be associated with an operation corresponding to the first opcode and with a packet filter associated with the packet filter field of the second opcode. The GTP tunnel may be a downlink tunnel and The TFT may be applied to the downlink tunnel and The first and second opcodes may be interpreted within an operator network. The GTP tunnel may be an uplink tunnel and The first and second opcode may be interpreted at a user equipment (UE).

DETAILED DESCRIPTION

Figure 1:
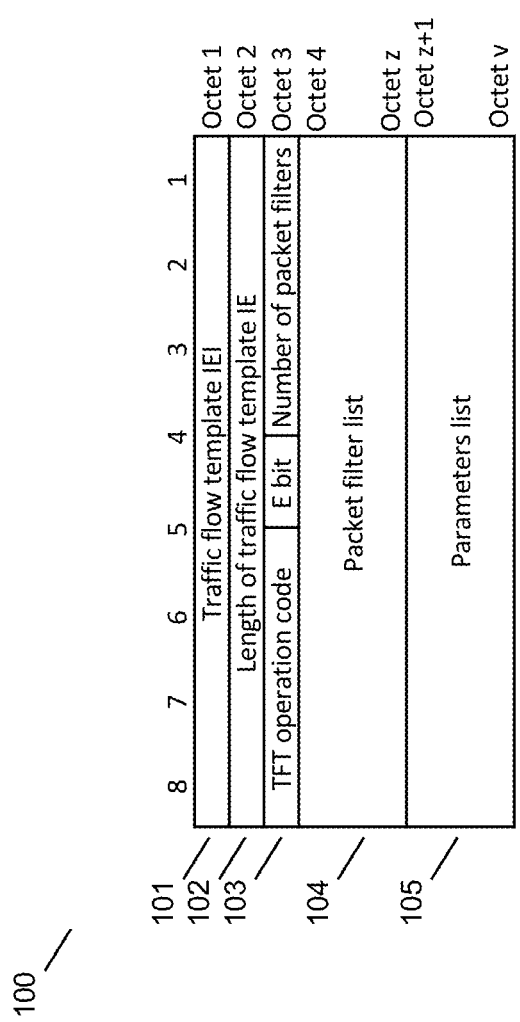
FIG. 1 is a traffic flow template information element, as known in the prior art.

Currently, in the 3GPP specification, when there are any updates in installed Packet Filters, only one TFT opcode can be included in Bearer Context IE in corresponding GTP signaling to update the UE. In the case when there are new packet filters to be installed along with update/deletion of existing packet filters, multiple messages over the network are required to add/replace/delete the requested packet filters.

As an example, consider Packet filters "A", "B", "C", "D" are installed on UE. PCRF provisions the following packet filter updates: a. Update packet filter "A"; b. Delete Packet Filter "B," "C"; c. Add new packet filters "E." In order to update these filters on UE, currently the network will trigger 2 GTP signals. First, an Update Bearer Request GTP message is sent to replace (and Add) packet filter "A" and "E," with "E" using the same packet filter ID of "B." Second, an Update Bearer Request GTP Message is sent to delete packet "C."

Existing TFT Information in Bearer Context as defined by 3GPP spec: 1. When a rule is installed, the corresponding TFT information is included in Bearer Context as sent to UE. This includes packet filter information identified by the packet filter ID. 2. When there is a policy change and if PCRF decides to update the installed rule, it will send the request to PCEF to install same rule with new TFT parameters. The new TFT parameters might be same or different and with different number of packet filters. 3. In order to update the TFT's at UE, TFT Information is included in Bearer Context of Update Bearer Request sent by PGW.

Since we can get different number of packet filters, two separate UBR's will be required to be sent. One to delete existing packet filters and another one to add new filters as the 3GPP Spec do not allow multiple opcode's to be included in single TFT-Information.

However, a problem arises according to the operation of the standard, namely, that when PCRF authorizes new policies to update a rule installed on a bearer, there could be multiple TFT Operation that would be required to update installed packet filters at UE. Since the current TFT IE inside Bearer Context IE does not support Multiple Opcodes to be included, multiple GTP messages are triggered by Network towards UE. This problem occurs in a disproportionately large number of cases, as the Update Packet Filter rule is almost always accompanied by an Add or Delete message due to the small number of available packet filter IDs (there are only 16 possible packet filter IDs, and in many cases the packet filter IDs are generated and assigned in the core network, for example, at the PGW in an LTE network). Also due to the decrease of atomicity in the installation of an updated packet filter using multiple messages, the chances of UE going out of sync w.r.t a packet filter is significantly increased, since a sync failure occurs when either one of the multiple GTP messages fails.

The solution proposed herein is to send packet operation codes within each packet filter of the updated TFT of the Bearer context IE so that all required TFT updates can be sent in the same GTP message. When a rule update is provisioned from PCRF to PGW for a session, the Update Bearer Request GTP message from PGW towards UE can contain TFT Operation code set as "Update existing TFT" and the corresponding opcodes (add/replace/delete) shall be provided in each packet filters with the proposed solution. This would reduce extra GTP signaling to send separate messages to indicate add/replace/delete of a packet filter. This will also help in avoiding out of sync issues with UE when one of the GTP message for updating packet filter is rejected by any of the network element or UE, or in case of network congestion where one of the signaling messages could be lost.

Consider the following example, in accordance with some embodiments. Packet filters "A", "B", "C", "D" are installed on UE. PCRF attempts to provision the following packet filter updates: a. Update packet filter "A"; b. Delete Packet Filter "B," "C"; c. Add new packet filters "E." These could be consolidated into a single message. A network node that receives multiple messages from the PCRF may combine and consolidate them into a single message, or, the PCRF may send a consolidated message directly.

With the proposed solution, each packet filter present in Bearer Context IE shall have operation code indicating type of operation to be performed for corresponding packet filter. So, all type of add/replace/delete type of operation can be triggered in the same GTP message. In most of the deployments multiple signaling would happen at GTP message.

In some embodiments, as per current 3gpp specifications, TFT IE contains TFT operation Code in Octet 3. TFT operation code is applicable for all packet filters included in packet filter list. However, in the present disclosure, it is proposed to include TFT operation code at TFT IE level and Packet Filter Operation code at Packet Filter level. The Proposed solution is to conceptually split existing TFT operation code into 2 parts: a. TFT operation code—applicable to all packet filters included in TFT IE; and b. Packet filter Operation code—applicable to corresponding Packet filter.

Adding a new opcode to provide the functionality to update an existing TFT solves many of the problems described above. Further, a packet filter opcode may be added within previously-unused portions of the TFT IE to enable the incorporation of multiple TFTs in a single IE, as is desired when the newly-proposed single message to update an existing TFT is created. The use of the packet filter opcode allows some packet filters to be used for the "add" operation, some packet filters to be used for the "replace" operation, and some packet filters to be used for the "delete" operation. The TFT IE is still constrained by protocol-determined limits on the size of the TFT IE.

Specifically, a new TFT Operation Code at TFT IE level is proposed to be added, for "Update Existing," in some embodiments:

TABLE 1

| Bit value | Opcode |
| --- | --- |
| 0 0 1 | Create new TFT |
| 0 1 0 | Delete existing TFT |
| 1 0 0 | Update existing TFT |
| 1 1 0 | No TFT operation |

Also, a new Packet Filter Operation Code is proposed to be made part of the packet filter list at a per-packet filter level, in some embodiments using the following values:

TABLE 2

| Bit value | Opcode |
| --- | --- |
| 0 1 | Add packet filters to existing TFT |
| 1 0 | Replace packet filters in existing TFT |
| 1 1 | Delete packet filters from existing TFT |

Relationship between TFT operation Code and corresponding Packet Filter operation Code, in some embodiments:

TABLE 3

| TFT Operation Code | Applicable Packet Filter Operation code. |
| --- | --- |
| Create New TFT | Not applicable. Operation Code in packet filter shall be ignored. |
| Delete Existing TFT | Not applicable. Operation Code in packet filter shall be ignored |
| Update Existing TFT | Add/update/delete Existing packet filters |

Upon receipt of a TFT IE message containing an opcode, the opcodes may be interpreted to determine which operation is intended, and, in the case any operation beyond delete is required or in case a compound operation is intended, which packet filters apply to which operations. In some embodiments the order of the packet filters may be used to determine the order of operations. The interpretation of the TFT IE may be at the GTP endpoint receiving the message, in some embodiments. The GTP endpoint may then carry out the relevant operation as described in the standard. When an Update Existing TFT opcode is present, a plurality of packet filter operation codes may be present and may correspond to add/delete/update for that particular packet filter.

FIG. 1 is a traffic flow template information element, as known in the prior art. Traffic flow template information element (TFT IE) 100 is shown. TFT IE 100 includes a variety of fields, starting with traffic flow template IEI. (An IE includes an Information Element Identifier (IEI), length, and value, as defined in 3GPP TS 24.007. Octet 1 (101) contains a traffic flow template IEI, indicating that this IE is a TFT IE. Octet 2 (102) contains a length of the traffic flow template IE. Octet 3 (103) includes a TFT operation code (opcode) in bits 6-8, an E bit at bit 5, and a number of packet filters at bits 1-4; the number of packet filters combined with the length of the IE 102 defines the structure of the rest of the IE. Following is a variable number of octets 4 through z (104) that contain the packet filter list, and another variable number of octets z+1 through v (105) that contain the parameters list. Further information about the TFT IE is found in 3GPP TS 24.008 at FIG. 10.5.144. The TFT IE 100 shown is a generic IE that shows the format used for a variety of packet filter messages.

Figure 2:
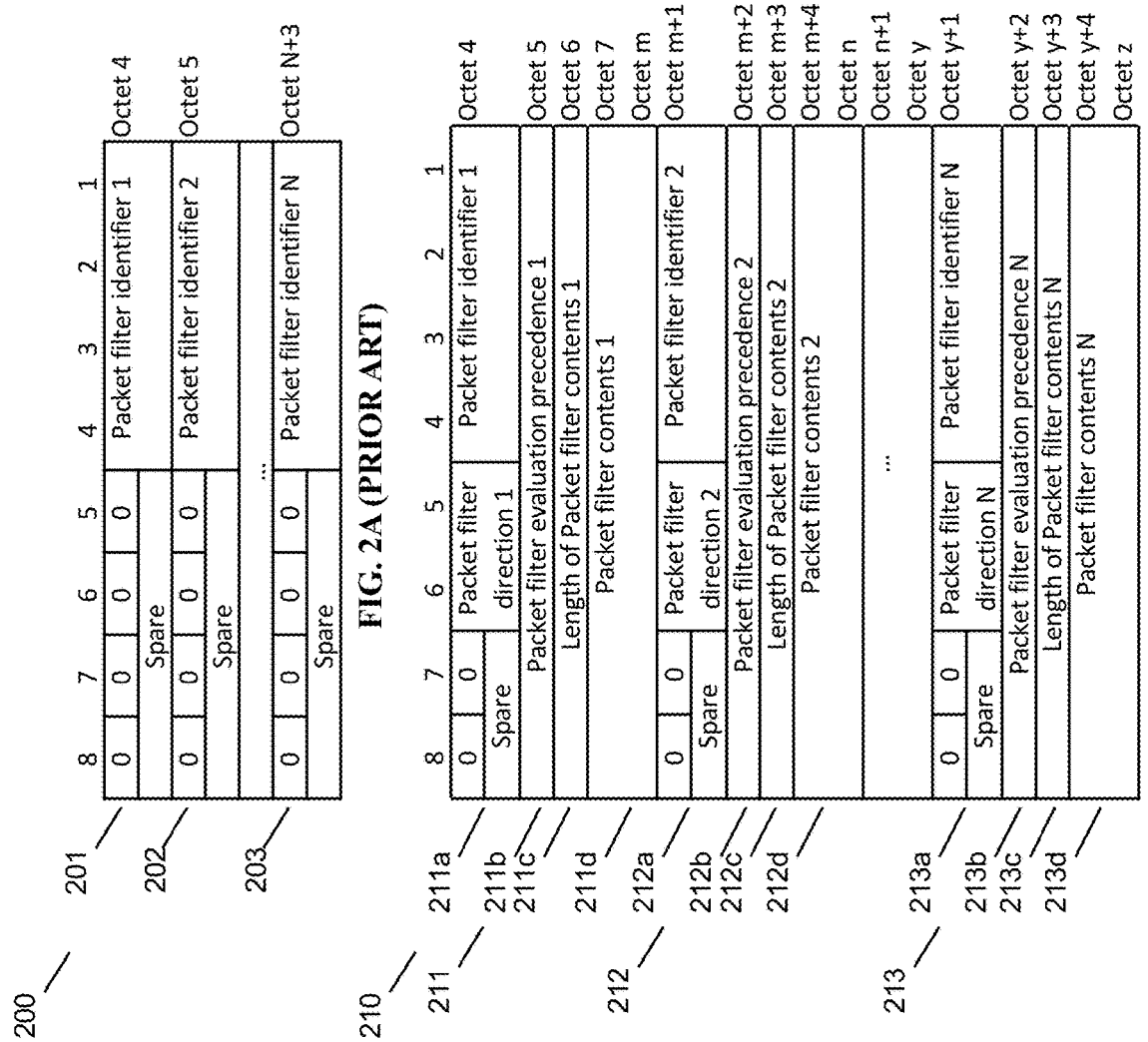
FIG. 2A is a packet filter list, as known in the prior art.
FIG. 2B is a further packet filter list, as known in the prior art.

FIG. 2A is a packet filter list, as known in the prior art. The packet filter list is found within the TFT IE, i.e. at octets 4 through z (104). The packet filter list as shown at 200 is a packet filter list when the TFT operation is "delete packet filters from existing TFT" (z=N+3). Octet 4 of IE 100 (201) is a first packet filter, having four bits used for the packet filter identifier (bits 1-4) and four bits left unused. Octet 5 of IE 100 (202) is a second packet filter, having four bits used for the packet filter identifier (bits 1-4) and four bits left unused. Octet n+3 of IE 100 (203) is an nth packet filter, having four bits used for the packet filter identifier (bits 1-4) and four bits left unused. The number of packet filters depends on the value set in IE 100 in field 103.

For a delete packet filter operation, it is not necessary to provide arguments for the operation. Therefore no parameters are needed to be provided in the IE. Also, there is no need for bits 5-8 to be used to provide further information to perform the packet filter deletion. The packet filter identifier is all that is needed. However, in this prior art IE, the four higher bits of the octet are unused. Also, when implemented, the delete packet filter operation is typically accompanied with additional operations to add new packet filters, often to reuse the existing packet filter identifier, as there are only $2^4=16$ possible packet filter identifiers and consequently it is important to conserve these identifiers.

FIG. 2B is an exemplary further packet filter list, as known in the prior art, for a TFT IE when the TFT operation is a "create new TFT" operation, an "add packet filters to existing TFT" operation, or "replace packet filters in existing TFT" operation. Packet filter list 210 includes packet filters 211, 212, . . . 213. Packet filter 211 includes, at octet 4 (211a), packet filter identifier 1, packet filter direction 1, and spare bits 7 and 8; at octet 5 (211b), packet filter evaluation precedence 1; at octet 6 (211c), length of packet filter contents 1; and at octets 7-m (211d), packet filter contents 1. Packet filter 212 includes, at octet m+1 (212a), packet filter identifier 2, packet filter direction 2, and spare bits 7 and 8; at octet m+2 (212b), packet filter evaluation precedence 2; at octet m+3 (212c), length of packet filter contents 2; and at octets m+4–n (212d), packet filter contents 2. Packet filter 213 includes, at octet y+1 (213a), packet filter identifier N, packet filter direction N, and spare bits 7 and 8; at octet y+2 (213b), packet filter evaluation precedence N; at octet y+3 (213c), length of packet filter contents N; and at octets y+4–z (213d), packet filter contents N.

Figure 3:
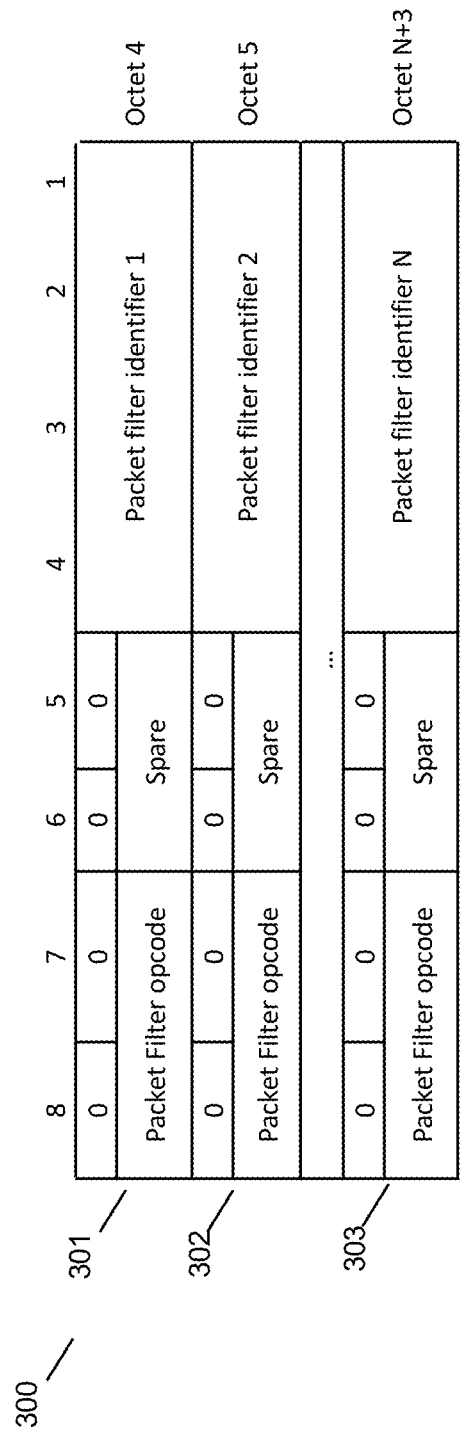
FIG. 3 is a packet filter list in accordance with some embodiments.

FIG. 3 is an exemplary packet filter list in accordance with some embodiments. The shown packet filter list is appropriate for a delete packet filter operation. Packet filter list 300 includes packet filter 301, packet filter 302, and packet filter 303. Packet filter 301 is located in octet 4. Packet filter 302 is located in octet 5. Packet filter 303 is located in octet N+3. Each of packet filters 301, 302, 303 include a new packet filter opcode, which resides in the top two bits 7-8 of the appropriate packet filter octet. In comparison with FIG.

2A, the new packet filter opcode resides in two of the four spare bits of the packet filter opcode that were previously unused, and is applied to the specific packet filter in which portion the opcode resides, i.e., the opcode found in bits 7-8 of octet 4 is used for packet filter 1 301. The use of the packet filter operation codes is described throughout the present disclosure.

Figure 4:
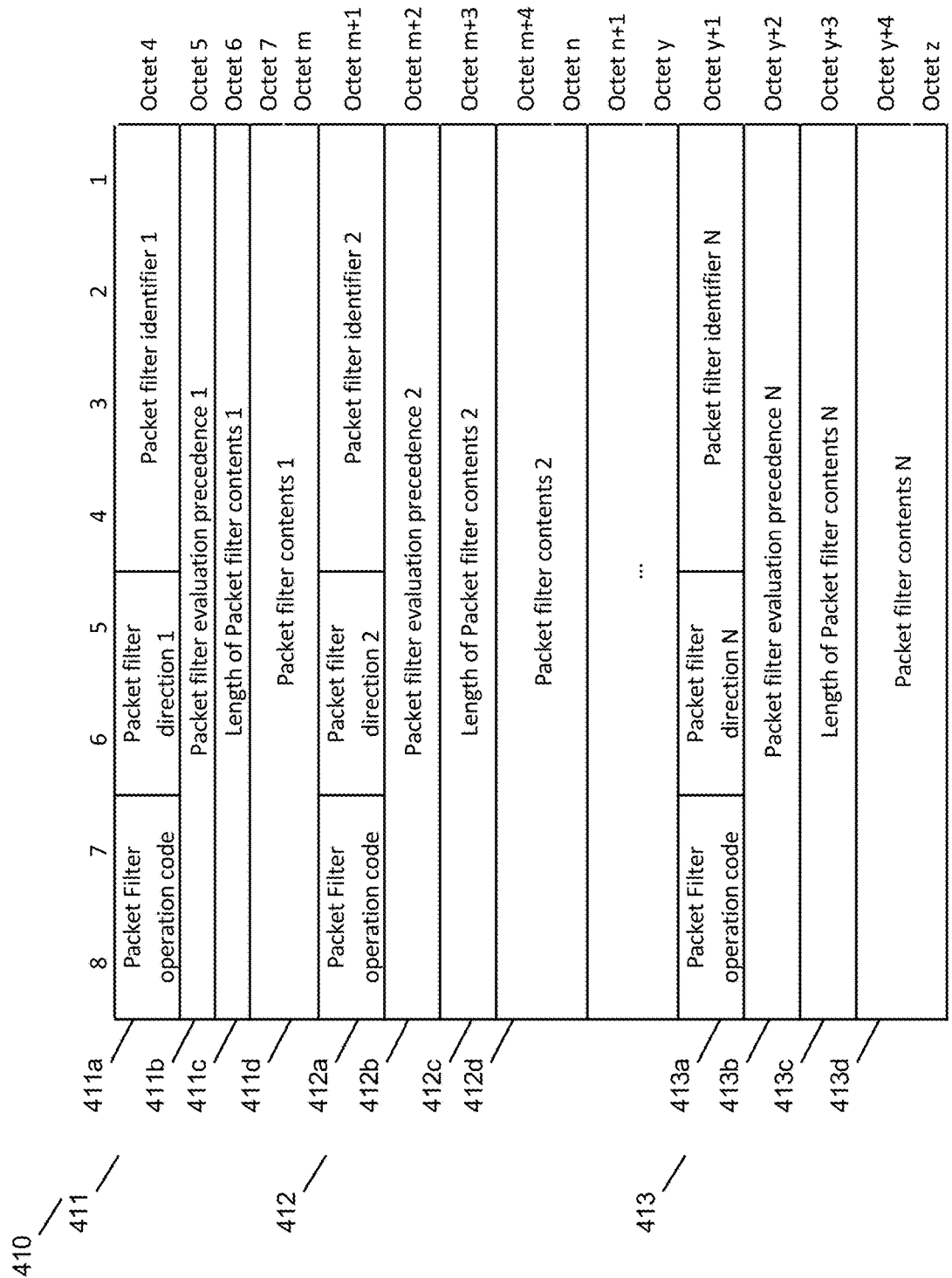
FIG. 4 is a further packet filter list in accordance with some embodiments.

FIG. 4 is an exemplary further packet filter list in accordance with some embodiments. The shown packet filter list is appropriate for a create new TFT, add packet filters to existing TFT, or replace packet filters in existing TFT operation. Packet filter list 410 includes packet filters 411, 412, . . . 413. Packet filter 411 includes, at octet 4 (411*a*), packet filter identifier 1, packet filter direction 1, and a packet filter operation code in place of previously-unused bits 7 and 8; at octet 5 (411*b*), packet filter evaluation precedence 1; at octet 6 (411*c*), length of packet filter contents 1; and at octets 7–m (411*d*), packet filter contents 1. Packet filter 412 includes, at octet m+1 (412*a*), packet filter identifier 2, packet filter direction 2, and a packet filter operation code in place of previously-unused bits 7 and 8; at octet m+2 (412*b*), packet filter evaluation precedence 4; at octet m+3 (412*c*), length of packet filter contents 4; and at octets m+4–n (412*d*), packet filter contents 4. Packet filter 413 includes, at octet y+1 (413*a*), packet filter identifier N, packet filter direction N, and a packet filter operation code in place of previously-unused bits 7 and 8; at octet y+2 (413*b*), packet filter evaluation precedence N; at octet y+3 (413*c*), length of packet filter contents N; and at octets y+4–z (413*d*), packet filter contents N. In comparison with FIG. 2B, the new packet filter opcode resides in two of the four spare bits of the packet filter opcode that were previously unused, and is applied to the specific packet filter in which portion the opcode resides, i.e., the opcode found in 411*a* is used for packet filter 1 411. The use of the packet filter operation codes is described throughout the present disclosure.

Figure 5:
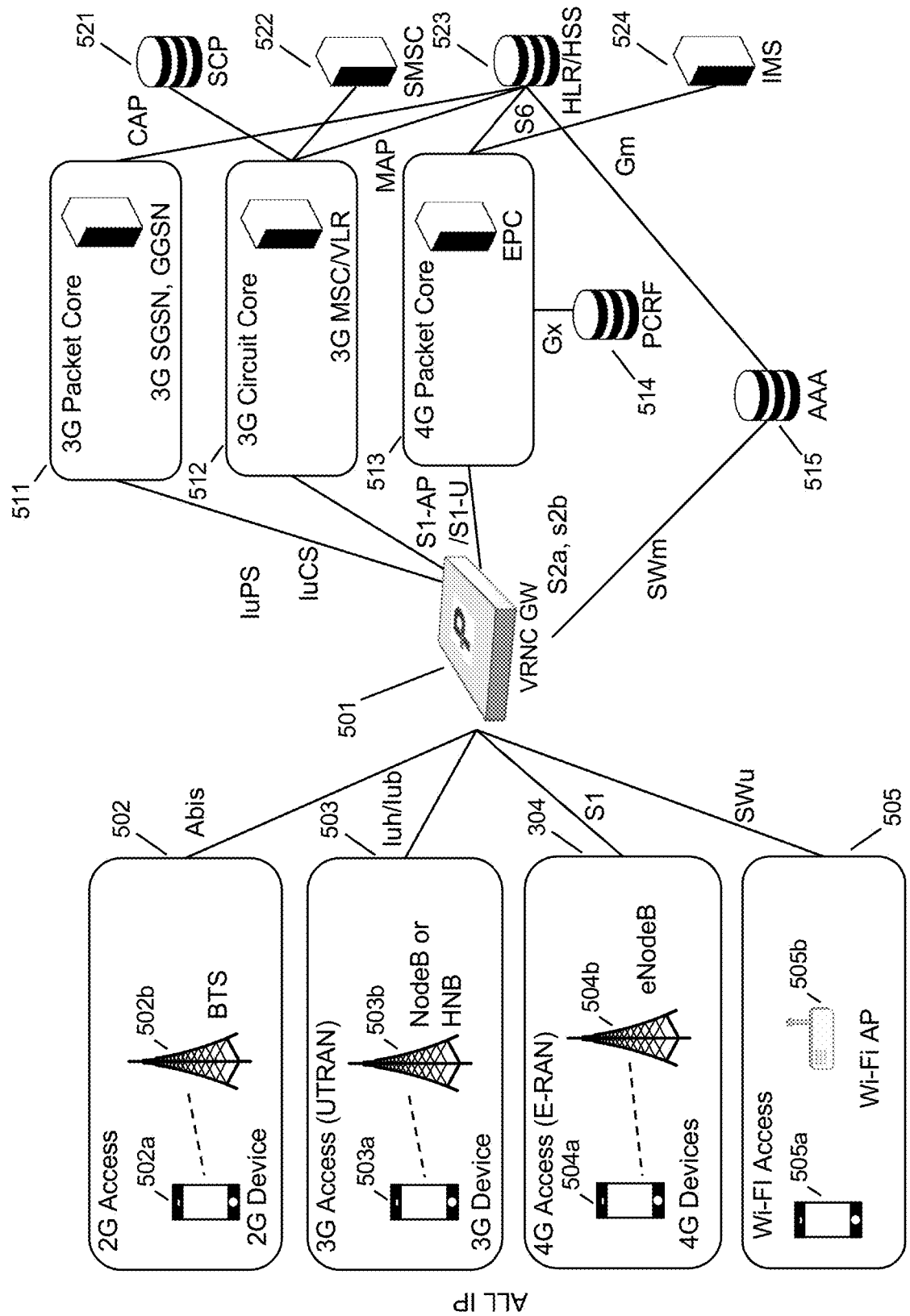
FIG. 5 is a network architecture diagram, in accordance with some embodiments.

FIG. 5 is a schematic network architecture in accordance with some embodiments. The architecture shown is an exemplary "brownfield" deployment architecture, i.e., an architecture being deployed using existing equipment and assets, and adds a virtual RNC gateway (VRNCGW) 501, which can be a Parallel Wireless HetNet Gateway, or other virtualizing, coordinating, and base station managing node. 2G RAN (GERAN) 502, with mobile station (MS) 502*a* and BTS 502*b*, is represented, but an Abis interface is made directly between GERAN 502 and gateway 501. 5G RAN (UTRAN) 503, with UE 503*a* and base station 503*b*, connects directly to gateway 501 via Iuh or Iub without an RNC, as the gateway handles the RNC functions. If a nodeB is used, the Iub protocol may be used; if a home NodeB or femto is used, the Iuh protocol may be used. 4G RAN (EUTRAN) 504 is represented by UE 504*a* and eNodeB 504*b*, which communicates via S1 to the gateway 501; S1 is the protocol/interface used for eNodeBs in communicating with the LTE base station managing node, the MME. A Wi-Fi RAN 505, including Wi-Fi device 505*a* and AP 505*b*, using SWu, is also directly connected to VRNCGW 501, which permits it to be part of the mobile operator network. Instead of SWu, S2a and S2b may also be used; S2a may be used by/for a trusted wireless access gateway (TWAG), and provides a single IPsec tunnel, while S2b is used for interacting as an evolved packet data gateway (ePDG), which is an untrusted gateway that permits multiple IPsec sessions to be opened.

Gateway 501 handles all protocol communications with the inner core network. It may send 5G sessions to either the 5G packet core 511 or the 5G circuit core 512, or 4G sessions to the 4G packet core 513, or circuit-switched fallback (CSFB) sessions to 5G circuit core 512. Authentication, location registration, or packet-based VoIP etc. is handled according to the prior art by PCRF 514, AAA 515, SCP 521, SMSC 522, HLR/HSS 523, IMS 524 as usual. By the action of the gateway 501 as a virtualizing proxy, extraneous details of the RAN are hidden from the core network and vice versa. The gateway is also enabled to perform steering or slicing as appropriate, so that certain UEs or base stations can be directed to other "Gs" (RANs) or resources can be split among networks. The 2G GERAN core network has been eliminated, as all 2G sessions can be handled by the 5G core. Although the legacy GERAN requires that the gateway 501 use Abis, the core network may view the legacy 2G MS's as 5G UEs. The VRNC may provide both a virtual RNC and a HNBGW, in some embodiments, thus enabling RAN virtualization and coordination for both 5G and 4G nodes. The VRNC may also provide a virtual BSC in some embodiments for legacy GERAN base stations. The presently-described GTP tunnel protocol enhancement may be applied to 4G, or to any of the other Gs described herein.

This architecture has the following advantages and characteristics, in some embodiments. By having the different RANs share a single gateway and by having UEs/MS's share core networks, less complexity is required in the core and operators are not required to keep multiple core networks active. A heterogeneous network is enabled to be used efficiently. As well, although implementation of the gateway 501 requires increased complexity, this results in additional potential for features to be added, such as coordination features across RAN technologies. By terminating connections, lower-layer encryption is typically not in place, allowing for deep packet inspection and lawful intercept (although application-layer encryption is still potentially in place).

Further description of this network architecture can be found in U.S. Pat. Pub. No. US20180041934A1, which is hereby incorporated by reference in its entirety.

Figure 6:
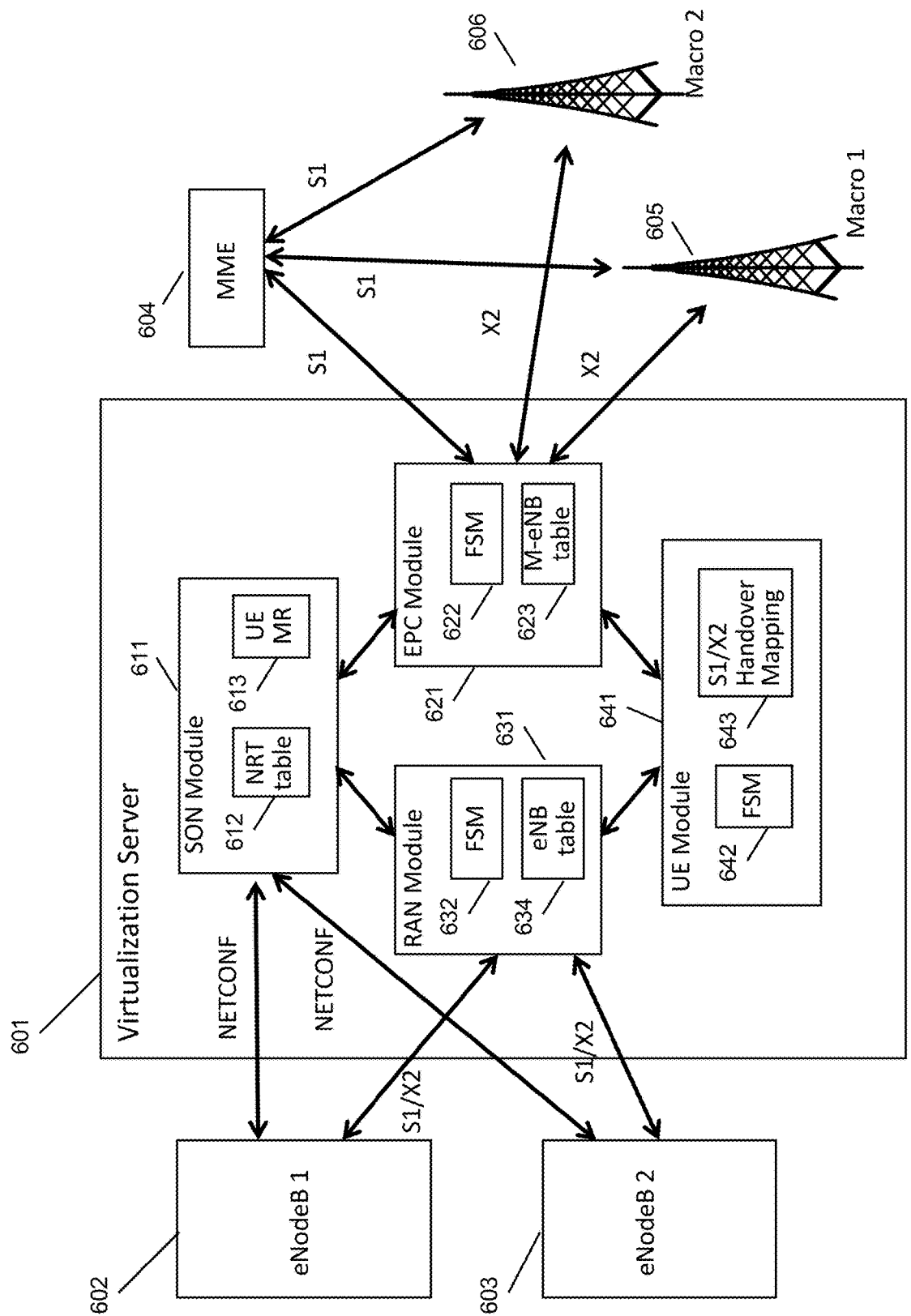
FIG. 6 is a schematic architecture diagram of an exemplary gateway, in accordance with some embodiments.

FIG. 6 is a schematic diagram of a base station management gateway in a Long Term Evolution (LTE) architecture, in accordance with some embodiments. Base station management server 601 provides services to, and is coupled to, eNodeB 1 602 and eNodeB 6 603, on a RAN side of a network (i.e., inside of the gateway). Base station management server 601 provides services to, and is coupled to, MME 604, macro eNodeB 605, and macro eNodeB 606, on a core network side of the network (outside of the gateway). Within base station management gateway 601 are self-organizing network (SON) module 611, containing neighbor relation table (NRT) 612 and UE measurement report processing module 613; evolved packet core (EPC) module 621, containing EPC finite state machine module 622 and macro eNodeB table 623; radio access network (RAN) module 631, containing eNodeB finite state machine module 632 and eNodeB table 634; and user equipment (UE) module 641, containing UE finite state machine module 642 and S1/X2 handover mapping table 643. Each of modules 611, 621, 631, and 641 are coupled to each other within base station management gateway 601, and may execute on one or more shared processors (not shown) coupled with memory (not shown). Each of modules 611, 621, 631, and 641 may be updated to incorporate the updated GTP-U signaling described herein and to provide TFT and QoS services on data connections to/from the core network and to/from the base stations and/or UEs managed by the base station management gateway.

In some embodiments, SON module 611 may perform NRT maintenance, load information processing and fractional frequency reuse (FFR) processing; RAN module 631 may perform X2 association management with eNodeBs 602, 603; EPC module 621 may perform X2 association management with macro eNodeBs 605, 606; and UE module may perform X2 handover and S1/X2 translation between eNodeBs 602, 603 and macro eNodeBs 605, 606. All the above managers/modules interact with each other to accomplish the assigned functionality.

Alternatives

While the present disclosure identifies GTP tunnels between a core network (e.g., a PGW) and a UE, the inventors have appreciated that GTP tunnels exist between core network devices, gateways, and the like, and that not all GTP tunnels are terminated at a UE. Further, the presently-disclosed methods can be used by the core network when putting downlink TFTs into place, as well as between non-UE nodes. Further, in the event that a gateway, such as the base station management gateway 601 shown in FIG. 6, is used to terminate tunnels to/from a core network, the gateway could use an updated version of the GTP protocol as described herein to/from the core network and could establish standards-compliant GTP tunnels to/from the gateway to the UE.

Various alternative embodiments are also contemplated by the inventors. For example, certain functions may be performed at a base station, such as a multi-radio access technology node (multi-RAT) node or base station, or certain functions may be performed at a base station management gateway. The base station management gateway may substantially take the form of the described Parallel Wireless coordinating server. The base station management gateway may be a virtualization server. The functions of the base station management gateway may be broken up and spread across multiple network nodes, or multiple software or hardware modules within the same network node, and may be physically located in a single location, or multiple locations. The network node may be in the data path located between the radio access network (RAN) and the core network, in some embodiments, or may be located at another location in the network. A high-bandwidth wired connection may be used for backhaul, such as coaxial cable, fiber optic cable, or Ethernet, or a reduced-bandwidth wireless connection, such as microwave, line-of-sight, or other physical connections may be used as backhaul.

In the present disclosure, the words "NodeB" or "eNodeB" are used to refer to a cellular base station. However, one of skill in the art would appreciate that it would be possible to provide the same functionality and services to other types of base stations, specifically to BTSes, non-3GPP base stations, CDMA base stations, CDMA2000 base stations, Wi-Fi access points, and home eNodeBs (HeNodeBs), as well as any equivalents.

The present disclosure is focused on the protocols and versions known at the time of filing; however, the inventors have understood and appreciated that, in the event that IEs change in future version of the protocol or future protocols, or in the event that more or fewer bits become available for use in a later version of the standard, the same principles may be used to provide a combined update TFT opcode with more bits, and/or to provide opcodes in the IEs that are associated with individual packet filters with more bits, or to use different spare bits in the IE to transmit the opcodes.

In some embodiments, the mesh network nodes may provide complete or partial guesses at what paths are the optimal or best paths during a particular time interval, and may be enabled to send messages back to the base station management gateway to communicate these complete or partial guesses.

In some embodiments, the base stations described herein may be compatible with a 3GPP UMTS or Long Term Evolution (LTE) radio transmission protocol or air interface. The LTE-compatible base stations may be eNodeBs. In addition to supporting the 3G WCDMA protocol, the base stations may also support other air interfaces, such as 5G (standalone/non-standalone), LTE, UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The above-described features and applications can be implemented as software processes that are specified as a set of instructions recorded on a computer-readable storage medium (also referred to as computer readable medium). When these instructions are executed by one or more processing unit(s) (e.g. one or more processors, cores of processors, or other processing units), they cause the processing unit(s) to perform the actions indicated in the instructions. Examples of computer readable media include, but are not limited to, CD-ROMs, flash drives, hard drives, RAM chips, EPROMs, etc. The computer-readable media does not include carrier waves and electronic signals passing wirelessly or wired connections.

In the specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronics systems, define one or more specific machine implementations that execute and perform the operations of the software programs.

A computer program (also known as program, software, software application, script, or code) can be written in any form of programming language, including compiled or interpreted languages, declarative or procedural languages, and it can be deployed in any form, including as a standalone program or as a module, component, subroutine, object, or another unit suitable for use in a computing environment. A computer program may, but need not correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

These functions described above can be implemented in digital electronic circuitry, in computer software, hardware, or firmware. The techniques can be implemented using one or more computer program products. Programmable processors and computers can be included in or packaged as mobile devices. The process and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), readable compact discs (CD-R), rewritable compact discs (CD-RW), read-only digital versatile discs (e.g., DVD-ROM, dual-layer DVD-ROM), a variety of recordable/rewritable DVDs (e.g. DVD-RAM, DVD-RW, DVD+RW, etc.), flash memory (e.g., SD cards, mini-SD cards, micro-SD cards, etc.), magnetic or solid-state hard drives, read-only and recordable Blu-Ray® discs, ultra-density optical discs, any other optical or magnetic media, and floppy disks. The computer-readable media can store a computer program that is executed by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored in the circuit itself.

As used in this specification and any claims of this application, the terms "computer", "server", "processor", and "memory" all refer to electronic or other technological devices. These terms exclude people or groups of people. For the purpose of the specification, the terms display or displaying means displaying on an electronic device. As used in this specification and any claims of this application, the terms "computer-readable media" and "computer readable medium" are entirely restricted to tangible, physical objects that store information in a form that is readable by a computer. These terms exclude any wireless, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, or any other available monitor types, for displaying information to the user and a keyboard and a pointing device, e.g., mouse or trackball, by which the user can provide input to the computer. Other kinds of devices can be used to provide for interaction with a user as well; for example, feedback provided to the user can be any form of sensory feedback, e.g., visual feedback, tactile feedback, or auditory feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication network include a local area network ("LAN"), an inter-network (e.g., the Internet), and peer-to-peer networks (e.g., ad-hoc peer-to-peer networks). The components of the described system may be located at a gateway, which may be located within a core network or between a core network and a access network (including a radio access network). Support for a version of GTP that has been configured to use the methods and processes described herein may be provided at both endpoints of a tunnel. For example, endpoints may be provided at a UE and a core network server such as a PGW, or, at an eNodeB or other RAN node and at a core network gateway, or, at a RAN node and at another RAN node, or, at another RAN node and a gateway located between the RAN and the core network, or, at a gateway located between the RAN and the core network and a core network server.

It is understood that any specific order or hierarchy of steps in the processes disclosed, or sequence of messages or parameters in a message, is an illustration of example approaches. For example, different spare bits may be used for opcodes or portions of an opcode. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and system can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in singular is not intended to mean "one and only one" unless specifically so states, but rather "one or more." Unless expressly stated otherwise, the term "some" refers to one or more. Pronouns in the masculine (e.g., his) include the feminine and neuter gender (e.g., her and its) and vice versa. Headings and subheadings, if any, are used for convenience only, and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations or one or more configurations. A phrase, for example, a configuration may refer to one or more configurations and vice versa.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, hybrid combinations of such networks, and the like. The methods may apply to LTE-compatible networks, to UMTS-compatible networks, to 5G networks (standalone or non-standalone), to core networks that are wired but provide services to devices that utilize radio frequency data transmission, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention, which is specified in the following claims.

The invention claimed is:

1. A method, comprising:
   in a general packet radio services (GPRS) tunneling protocol (GTP) message to update a GTP tunnel with a traffic flow template (TFT), sending a first opcode in a header of a TFT message, the first opcode comprising a TFT operation code at TFT IE level;
   sending a second opcode in a packet filter field of the TFT message, the second opcode comprising a Packet Filter Operation Code at Packet Filter level;
   interpreting the first opcode to initiate at least two of creation, deletion, and updating of traffic flow templates (TFTs);
   interpreting the second opcode to identify an existing packet filter for adding, replacing, or deleting a packet filter; and
   consolidating two GTP messages into a single GTP message including the first opcode and the second opcode.

2. The method of claim 1, wherein the first opcode is an update existing TFT opcode.

3. The method of claim 1, wherein the first opcode is an update existing TFT opcode and wherein the first opcode has bit values (1, 0, 0) from bit 8 to bit 6 of a third octet of the TFT message.

4. The method of claim 1, wherein the second opcode is a four-bit packet filter identifier.

5. The method of claim 1, wherein the second opcode is associated with an operation corresponding to the first opcode and with a packet filter associated with the packet filter field of the second opcode.

6. The method of claim 1, wherein the GTP tunnel is a downlink tunnel and wherein the TFT is applied to the downlink tunnel and wherein the first and second opcodes are interpreted within an operator network.

7. The method of claim 1, wherein the GTP tunnel is an uplink tunnel and wherein the first and second opcode are interpreted at a user equipment (UE).

8. A non-transitory computer-readable medium containing instructions which, when executed at a processor located at a network node, causes the network node to perform steps comprising:
   in a general packet radio services (GPRS) tunneling protocol (GTP) message to update a GTP tunnel with a traffic flow template (TFT), sending a first opcode in a header of a TFT message, the first opcode comprising a TFT operation code at TFT IE level;
   sending a second opcode in a packet filter field of the TFT message, the second opcode comprising a Packet Filter Operation Code at Packet Filter level;
   interpreting the first opcode to initiate at least two of creation, deletion, and updating of traffic flow templates (TFTs);
   interpreting the second opcode to identify an existing packet filter for adding, replacing, or deleting a packet filter; and
   consolidating two GTP messages into a single GTP message including the first opcode and the second opcode.

9. The non-transitory computer-readable medium of claim 8, wherein the first opcode is an update existing TFT opcode.

10. The non-transitory computer-readable medium of claim 8, wherein the first opcode is an update existing TFT opcode and wherein the first opcode has bit values (1, 0, 0) from bit 8 to bit 6 of a third octet of the TFT message.

11. The non-transitory computer-readable medium of claim 8, wherein the second opcode is a four-bit packet filter identifier.

12. The non-transitory computer-readable medium of claim 8, wherein the second opcode is associated with an operation corresponding to the first opcode and with a packet filter associated with the packet filter field of the second opcode.

13. The non-transitory computer-readable medium of claim 8, wherein the GTP tunnel is a downlink tunnel and wherein the ITT is applied to the downlink tunnel and wherein the first and second opcodes are interpreted within an operator network.

14. The non-transitory computer-readable medium of claim 8, wherein the GTP tunnel is an uplink tunnel and wherein the first and second opcode are interpreted at a user equipment (UE).

* * * * *